Patented Apr. 10, 1945

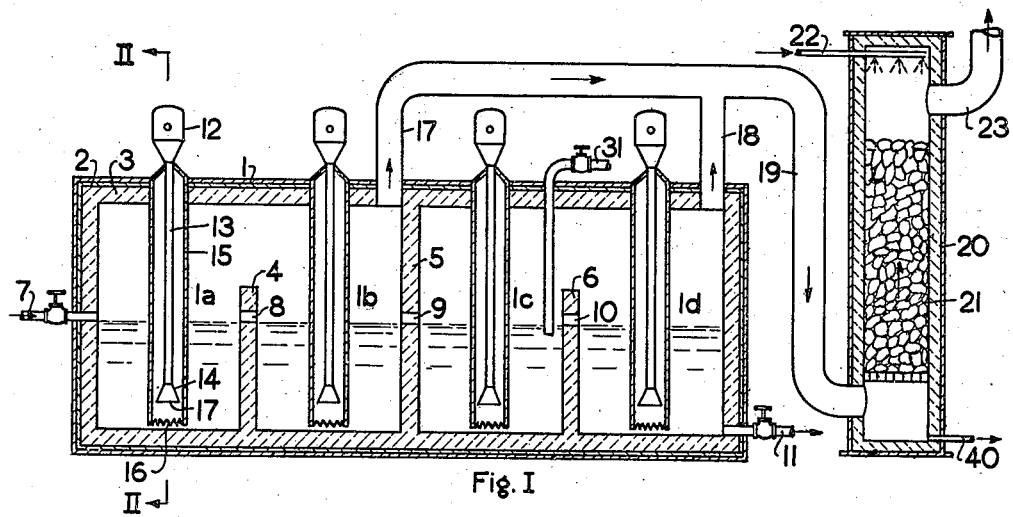
Fig. I
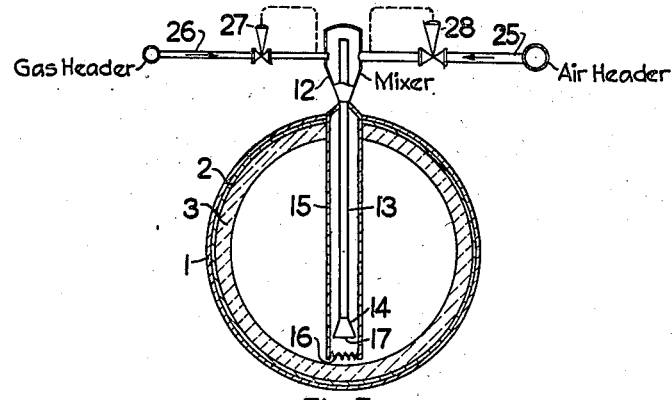
Fig. II
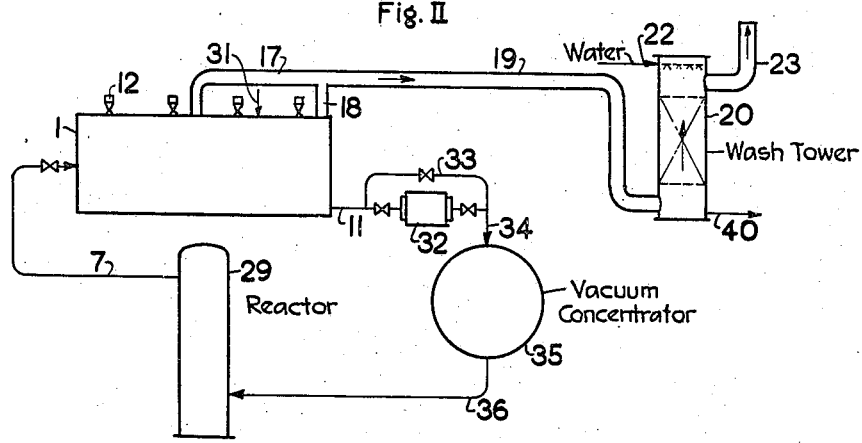
Fig. III
Inventors: Frank E. Caddy
Charles H. Duffy
Maarten Voogd
By their Attorney:

2,373,359

UNITED STATES PATENT OFFICE 2,373,359

ACID RECOVERY PROCESS

Maarten Voogd, Long Beach, Frank E. Caddy, Compton, and Charles H. Duffy, Long Beach, Calif., assignors to Shell Development Company, San Francisco, Calif., a corporation of Delaware Application March 8, 1943, Serial No. 478,452

9 Claims. (Cl. 23—172)

This invention relates to the purification and concentration of inorganic acids and particularly to the recovery of the inorganic acid content of waste acid liquors contaminated with organic impurities. It deals with a practical method for the recovery of sulfuric acid from the waste acid obtained in chemical processes and provides an improved and more economical method for recovering such acid in a condition suitable for re-use.

For purposes of illustration the invention will be described with particular reference to its application to the recovery of sulfuric acid from waste acid liquors such as are obtained in the manufacture of alcohols, ethers, and the like from olefins as described, for example, in U. S. Patents 1,912,695, 2,060,143 and 2,088,083.

When alcohols are manufactured by absorbing one or more olefins in sulfuric acid, usually of about 85 to 100% concentration, and diluting and hydrolyzing the resulting alkyl sulfates, a stripped acid liquor is obtained after removal of the alcohol or alcohols, which acid liquor is generally too dilute to be directly returned to the process for absorption of more olefin.

Due to the presence of organic impurities in the acid liquor it cannot be continuously reconcentrated and re-used after concentration in a vacuum concentrator as the carbon content of the acid gradually increases to such an extent that the presence of the impurities seriously interferes with the delicate control necessary in the alcohol manufacturing process. A still more important objection to the presence of such carbonaceous impurities in the reaction system resides in the fact that the presence of such material causes active decomposition of the sulfuric acid in the acid concentrators, not only destroying a substantial amount of this reagent, but producing substantial volumes of sulfur dioxide gas which must be eliminated. According to the present invention it has been found that the organic impurities in the waste acid may be separated and removed by heating under particular conditions and, when followed by further heating under vacuum conditions, an acid entirely suitable for re-use in an alcohol manufacturing process can be continuously obtained.

The process of the present invention comprises essentially heating the acid liquor in several separate stages by separately generated hot combustion gases whereby a gradual concentration of the acid takes place and concomitantly a gradual separation and vaporization of the organic impurities. Final removal of low concentrations of inorganic impurities may be accomplished by the introduction of nitric acid into one of the concentrating stages which contains sulfuric acid at an optimum concentration for such treatment. Further concentration of the acid to a strength suitable for re-use in the alcohol manufacturing process may be carried out in a vacuum concentrator.

An important object of the invention is the provision of a method for reconcentrating spent acid wherein the carbonization and separation of organic impurities are reduced to a minimum and the vaporization of such impurities increased to a maximum. A further object is to provide a method and apparatus wherein a spent acid may be easily and economically purified and reconcentrated in a plurality of stages, with maximum flexibility of control provided for each stage.

Other objects, together with some of the advantages to be derived from operating according to the present invention, will become apparent in the following detailed description thereof, reference also being had to the accompanying drawing which forms a part of this specification and illustrates a preferred embodiment of the invention.

Referring to the drawing: Figure I is a longitudinal section of one form of the primary concentrator apparatus; Figure II is an end elevation through II—II of Figure I; Figure III is a schematic flow sheet of the process incorporating the primary concentrating apparatus shown in Figures I and II.

Referring particularly to Figure I, the apparatus comprises a horizontal steel tank 1 (hereinafter called the primary concentrator) divided into 4 chambers— 1a, 1b, 1c and 1d. The tank is provided with a lead lining 2 and also with a lining of acid resistant brick 3 within said lead lining in order to provide further protection for the metal. The partition walls 4, 5 and 6 separate the tank into the 4 chambers. The acid may be delivered to chamber 1a by means of pipe 7. From chamber 1a the acid flows to chamber 1b by an overflow pipe 8 in partition 4, thence to chamber 1c by means of overflow pipe 9 in partition 5, thence to chamber 1d by means of overflow pipe 10 in partition 6. The acid is withdrawn from chamber 1d through pipe 11.

In each of the chambers 1a, 1b, 1c and 1d is disposed a submerged combustion burner comprising a dip-pipe 15 extending from the top of the chamber downward so as to be immersed in the liquid for approximately one foot, or as much less or more as proves practical for a substantially complete exchange of heat from gas to liquid without causing an excessive liquid spray. For the last reason the lower end is serrated at 16, which aids in more effectively distributing the hot combustion products through the acid body. Within dip-pipe 15 is provided a gas-air mixture feed pipe 13 which terminates at its lower end in a dispersion cup 14 which is in turn provided with a perforated burner plate as at 17. A combustible gas-air mixture is supplied to feed pipe 13 from mixer 12.

Partition wall 5 reaches to the roof of the tank 1 in such a manner as to divide the vapor space of the tank into two parts, chambers 1a and 1b forming one part and chambers 1c and 1d the other. A vapor conduit 17 leads from the common vapor space of chambers 1a and 1b and joins with a vapor conduit 18 from the common vapor space of chambers 1c and 1d. The joint conduit 19 discharges into the bottom of a spray tower 20 which is filled with broken pieces of acid resistant brick or Raschig rings 21. A spray pipe 22 is arranged in the top of the tower to enable water to be sprayed downward therein. An outlet pipe 23 leaves the top of the tower and discharges into a stack (not shown). An oxidizing agent may be passed into chamber 1c through conduit 31.

Figure II illustrates the details of the submerged combustion burner which comprises a mixing chamber 12 into which an air conduit 25 and a gas conduit 26 discharge. Regulating valves 27 and 28 serve to control the ratio of air to gas supplied to feed pipe 13.

Referring to Figure III, spent acid having a concentration of about 45% by weight $H_2SO_4$ from a reactor 29 is passed through conduit 7 to primary concentrator 1. Acid leaving primary concentrator 1 through conduit 11 will have a concentration of approximately 70% $H_2SO_4$. This acid may either be passed through a filter unit 32 whereby separated carbonaceous materials remaining are removed; or, alternatively, if the acid impurities are of such nature that they are substantially all vaporized in primary concentrator 1, acid may be passed directly through conduits 11, 33 and 34 to a vacuum concentrator 35. After concentration under vacuum to any desired point, usually to approximately 85% $H_2SO_4$ for re-use in olefin absorption, the purified, reconcentrated acid is passed through conduit 36 and returned to reactor 29.

Referring again to Figure I, dilute, contaminated acid is continuously passed through conduit 7 and into the body of acid maintained in chamber 1a. A combustible gas mixture, usually air and methane, although any suitable combustible mixture which will yield combustion products having a temperature preferably of the order of 2800° F. may be utilized, is supplied to the submerged combustion burner. The combustion of the air-gas mixture is carried out continuously beneath the liquid level of the acid in chamber 1a, resulting in intimate contact between the hot combustion products and the acid as well as agitation of the acid as the combustion products pass upwardly therethrough and out of the concentrator through conduit 17.

As a result of the intimate contact between the dilute acid and the combustion products from the submerged burner, extremely efficient heat transfer is obtained, as evidenced by the fact that the temperature of the vapors exiting through conduit 17 is of the order of 200° F.

The dilute acid in passing successively through chambers 1a, 1b, 1c and 1d is gradually concentrated to approximately 70% $H_2SO_4$, after which it can most economically be further concentrated by means of a vacuum unit, as described above in connection with Figure III.

In the methods at present used for reconcentrating spent sulfuric acid, i. e., heating the spent acid either indirectly by means of steam coils or the like, or passing hot flue gases through the spent acid, considerable difficulty is had due to the formation and separation of carbonaceous material of such nature as to be extremely difficult to filter. According to the present invention it has been found that most of the impurities present in spent acid which has been used in absorbing olefins and similar processes are normally of such nature as to volatilize without substantial formation of precipitated carbonaceous material. However, the prolonged heating of the feed acid in an acid bath of considerable concentration and temperature tends to bring about the polymerization of the volatile impurities to form polymers which carbonize and separate from the acid as a precipitate or a difficultly filterable suspension, necessitating in turn the use of complicated and expensive filtering equipment.

These difficulties are greatly minimized, and in many instances completely eliminated, when acid is concentrated in the manner described in the present specification. When submerged combustion burners are utilized for heating purposes, the formation of such polymers appears to be inhibited, probably due to the fact that a more or less flash or (sudden) volatilization of the organic impurities occurs in each stage before substantial polymerization. Thus, the major portion of the organic contaminants in the spent acid is vaporized and removed through the vapor outlet along with the water vapor and combustion products from the submerged burners.

It will be found, however, that some types of spent acid contain relatively large quantities of higher boiling organic contaminants which are difficult to vaporize even when submerged combustion burners are utilized. In such instances, concentrated nitric acid or other suitable strong oxidizing agents may be added to the third stage of the primary concentrator through conduit 31, as shown in Figure I. In this manner, separated carbonaceous material passing into chamber 1c is oxidized to form carbon dioxide which passes overhead through conduit 18. An oxidizing agent should be utilized which will itself vaporize at a point not exceeding the boiling temperature of approximately 70% $H_2SO_4$, i. e., about 165° C. For this reason, nitric acid is preferably used for this purpose since any excess of nitric acid passing into chamber 1d will be vaporized and pass overhead through conduit 18. When reconcentrating sulfuric acid which has been utilized in absorbing olefins, it has been found that approximately 1% by weight of concentrated nitric acid added to the third stage of the primary concentrator is sufficient to oxidize the major portion of any non-vaporizable organic materials entering the third stage. It is preferable when utilizing nitric acid as an oxidizing agent to adjust the submerged combustion burners of the various stages in a manner to ensure that the nitric acid is added in the stage preceding the stage in which a concentration of 70% is maintained. The reason for this is, that while the oxidation with nitric acid is satisfactory between wide limits of sulphuric acid concentration, the removal of residual nitric oxides is extremely difficult at sulphuric acid concentrations exceeding 70%.

The vapor leaving primary concentrator 1 through conduit 19 comprises essentially a mixture of water vapor, carbon dioxide, nitrogen and small amounts of $SO_2$ and $SO_3$. This gas mixture is washed in spray tower 20 with a countercurrent water stream before being released to the atmosphere through conduit 23. Depending on availability of water, this water can be passed to the sewer through conduit 40 or, after cooling, in a cascade cooler recirculated through the condensing tower. In the latter case, the solution will be rendered acid by the small amount of acidic vapors being absorbed in the water and a small amount of acid spray being precipitated.

It is preferable, according to the present invention to carry out the concentration in the primary concentrator in several stages, as shown in Figure I, as in this manner the introduction of a relatively weak acid into a relatively strong, boiling acid may be avoided and the subsequent formation of non-volatile polymers from volatile organic contaminants further obviated.

It has been found that in most instances recovered, reconcentrated acids may be re-used for olefin absorption with results equivalent to the use of fresh acid if the organic contaminant content of the recovered acid is maintained at approximately 0.1% by weight or less. According to the present process the organic contaminant content of spent acids containing even as much as 0.5% by weight of organic contaminant may be easily reduced to the order of 0.1% or less without modification of the process as described above. For example, a spent acid having a concentration of 47.0% $H_2SO_4$ and containing 0.43% by weight organic contaminants was processed in the manner described above. The concentration was raised to 68.5% $H_2SO_4$ in the primary concentrator and thereafter further concentrated to 85.0% $H_2SO_4$ in a vacuum concentrator of the Mantius type. The reconcentrated acid upon analysis contained 0.07% by weight of organic contaminants. The acid in the third stage of the primary concentrator was treated with 0.8% by volume of concentrated nitric acid.

The number of stages which may be most efficaciously utilized in the primary concentrator will of course vary with particular acids, consideration being given to the spent liquor concentration and organic impurity content of the acid to be recovered. As has been mentioned before, the optimum concentration to which an acid may be reconcentrated by means of submerged combustion burners is of the order of approximately 70%; higher concentrations may be attained, although in view of the relatively large quantities of $SO_3$ evolved in passing hot combustion gases through sulphuric acid of high concentration, the economy of the process has to be restored by precipitation and recovery of this acid component. This, in general, may most satisfactorily be done by electrostatic precipitation. In general, it is preferable not to attempt to increase the concentration of a dilute acid more than approximately 10% on the average in each stage, from 5% to 10% on the average in each stage being the preferred range. It is to be emphasized, however, that in those installations wherein nitric acid is to be added to the primary concentrator a body of acid should be maintained in one stage having a concentration of at least approximately 60% by weight and not substantially exceeding 70% by weight, preferably within the approximate range of 65% by weight to 70% by weight.

We claim as our invention:

1. In a method of concentrating dilute sulfuric acid containing organic contaminants derived from olefin absorption processes, the steps comprising maintaining a plurality of separate bodies of acid of progressively increasing concentrations, passing said dilute acid to the first of said bodies of acid, withdrawing concentrated acid from the last of said bodies of acid, successively passing acid from each of said bodies of acid to the body of acid of next highest concentration and subjecting each of said bodies of acid to the action of a continuous stream of combustion gases produced by the action of submerged combustion burners beneath the surface of the acid whereby a maximum portion of said organic contaminants is suddenly volatilized.

2. In a method of concentrating dilute sulfuric acid containing organic contaminants derived from olefin absorption processes, the steps comprising maintaining a plurality of separate bodies of acid of progressively increasing concentrations, continuously passing said dilute acid to the first of said bodies of acid, continuously withdrawing concentrated acid from the last of said bodies of acid, continuously passing acid from each of said bodies of acid to the body of acid of next highest concentration and continuously subjecting each of said bodies of acid to the action of a continuous stream of combustion gases produced by the action of submerged combustion burners beneath the surface of the acid whereby a maximum portion of said organic contaminants is suddenly volatilized.

3. In a method of concentrating dilute sulfuric acid containing organic contaminants derived from olefin absorption processes, the steps comprising maintaining a plurality of separate bodies of acid of progressively increasing concentrations, continuously passing said dilute acid to the first of said bodies of acid, continuously withdrawing concentrated acid from the last of said bodies of acid, continuously passing acid from each of said bodies of acid to the body of acid of next highest concentration and continuously generating a stream of combustion gases having a temperature of the order of 2800° F. beneath the surface of each of said bodies of acid whereby a maximum portion of said organic contaminants is suddenly volatilized.

4. In a method of concentrating dilute sulfuric acid containing organic contaminants derived from olefin absorption processes, the steps comprising maintaining a plurality of separate bodies of acid of progressively increasing concentration, continuously passing said dilute acid to the first of said bodies of acid, continuously withdrawing concentrated acid from the last of said bodies of acid, continuously passing acid from each of said bodies of acid to the body of acid of next highest concentration, continuously subjecting each of said bodies of acid to the action of a continuous stream of combustion gases produced by the action of submerged combustion burners beneath the surface of the acid whereby a maximum portion of said organic contaminants is volatilized and subjecting remaining organic contaminants to the action of a strong oxidizing agent whereby they are suddenly volatilized.

5. In a method of concentrating dilute sulfuric acid containing organic contaminants derived from olefin absorption processes, the steps comprising maintaining a plurality of separate bodies of acid of progressively increasing concentrations, continuously passing said dilute acid to the first of said bodies of acid, continuously withdrawing concentrated acid from the last of said bodies of acid, continuously passing acid from each of said bodies of acid to the body of acid of next highest concentration, maintaining the concentration of one of said bodies of acid within the approximate range of 60% to 70% by weight of $H_2SO_4$, subjecting each of said bodies of acid to the action of a continuous stream of combustion gases produced by the action of submerged combustion burners beneath the surface of the acid whereby a maximum portion of said organic contaminants is suddenly volatilized and continuously adding a volatile oxidizing agent to said body of acid maintained within the approximate range of 60% to 70% by weight $H_2SO_4$ whereby a maximum portion of the remaining organic contaminants is suddenly volatilized.

6. The method according to claim 5 wherein the acid body to which the oxidizing agent is added is maintained at a concentration within the approximate range of 65% to 70% by weight $H_2SO_4$.

7. The method according to claim 5 wherein the oxidizing agent is nitric acid.

8. In a method of concentrating dilute sulfuric acid containing organic contaminants derived from olefin absorption processes, the steps comprising maintaining a plurality of separate bodies of acid, the concentration of the acid in said bodies increasing progressively by increments of approximately 5% to 10% by weight of $H_2SO_4$, continuously passing said dilute acid to the acid body having the lowest acid concentration, continuously withdrawing acid having a concentration of approximately 70% by weight $H_2SO_4$ from the acid body having the highest concentration, continuously passing acid from each of said bodies of acid to the body of acid of next highest concentration, maintaining the concentration of one of said bodies of acid within the approximate range of 60% to 70% by weight of $H_2SO_4$, subjecting each of said bodies of acid to the action of a continuous stream of combustion gases produced by the action of submerged combustion burners beneath the surface of the acid whereby a maximum portion of said organic contaminants is suddenly volatilized and continuously adding concentrated nitric acid to said body of acid maintained at a concentration within the approximate range of 60% to 70% by weight $H_2SO_4$ whereby a maximum portion of the remaining organic contaminants is sudenly volatilized.

9. The method according to claim 8 wherein the quantities of nitric acid added amount to approximately 1% by volume of the acid flowing through the acid body wherein the nitric acid is added.

MAARTEN VOOGD.
FRANK E. CADDY.
CHARLES H. DUFFY.